Patented Aug. 11, 1931

1,817,968

UNITED STATES PATENT OFFICE

ROY CROSS, OF KANSAS CITY, MISSOURI, ASSIGNOR TO CROSS DEVELOPMENT CORPORATION, A CORPORATION OF DELAWARE

PREPARATION OF ADSORBENTS

No Drawing. Original application filed December 22, 1921, Serial No. 524,290. Divided and this application filed November 10, 1923. Serial No 674,043.

This application is a divisional of an original application, Serial No. 524,290, filed under date of December 22nd, 1921.

My invention relates to a method of treating hydrocarbons and has for its object the dehydration, decolorization and neutralization of oil by the intimate contacting of the oil either in the liquid or vapor state with dried hydrous silicate of alumina. The most valuable hydrous silicate of alumina or Zeolite for this purpose is the naturally occurring substance known as Bentonite. Bentonite is the best of this class of adsorbent material and is possibly the active principle to be found in fuller's earth. A typical quality of Bentonite is that found near Ardmore, South Dakota, and has the following composition:

|  | Natural | Dried | Ignited |
|---|---|---|---|
| Moisture | 35.33% | 0.00% | 0.00% |
| Combined water | 4.61 | 7.13 | 0.00 |
| Silica | 38.70 | 59.85 | 64.45 |
| Alumina | 15.49 | 23.96 | 25.80 |
| Iron oxide | 2.18 | 3.38 | 3.64 |
| Lime | 0.83 | 1.29 | 1.39 |
| Magnesia | 1.81 | 2.80 | 3.01 |
| Sulphur | 0.71 | 1.07 | 1.15 |
| Alkalies | 0.34 | 0.52 | 0.56 |

This material has the property of absorbing a very large amount of water, forming a gelatinous mass with it and is capable of being diluted with water and forming a colloid to such a degree that the water permanently remains milky.

For the purpose of use, the hydrous silicate of alumina is perfectly dried but not ignited. It is then crushed and screened to the sizes desired. For some purposes it is used in a finely divided powder, others as coarse granules. For the dehydration of oils, the coarse granules are best as they absorb the water from the oil without producing a turbidity. For decolorizing lubricating oils, the coarse granules are best as they form a bed more pervious to the passage of the oil. To obtain the greatest decolorizing action, however, the more finely divided particles are most effective. After the hydrous silicate of alumina has been subjected to the action of the oil, it may be renewed by burning out the adsorbed carbonaceous material. In this case there is always a small amount of carbonaceous material remaining. This residual carbonaceous material may be readily removed by passing dry chlorine over the hot hydrous silicate of alumina. This renews the absorptive effect of the hydrous silicate of alumina and in addition, forms a small amount of anhydrous aluminum chloride, because of the chemical susceptibility of the aluminum silicate in this form.

When rejuvenated by chlorine, however, the hydrous silicate of alumina must be kept in perfectly dry containers.

The method of applying the hydrous silicate of alumina to the oil depends upon the character of the oil to be treated. In the case of pressure benzine or gasoline such as is obtained in the ordinary cracking plant, the color of the gasoline is such that it cannot be marketed under the ordinary Navy specifications. Decolorization is effected by pumping the gasoline through a warm bed of hydrous silicate of alumina and discharging it into a still containing hydrous silicate of alumina. The vapors arising from the still are made to pass through a dephlegmator containing hydrous silicate of alumina. At the normal rate of distillation under these circumstances pressure benzine which is ordinarily yellowish to red in color is now obtained water white in color.

When crude oil is treated direct, using a tower still, the hydrous silicate of alumina is placed in the upper portion of the tower or the tower furtherest removed from the still so that all of the benzine fraction goes through it. The size of this tower and the amount of hydrous silicate of alumina required varies with the character of the distillate. Ordinarily when processes such as the Cross process, described in Patent No. 1,423,500, are used, one pound of hydrous silicate of alumina in finely divided condition is sufficient for one pound of gasoline. If the hydrous silicate of alumina is placed in the still alone a larger quantity is required. When distillation is complete, the hydrous silicate of alumina is steamed out to remove all of the oil and the particles have a greenish to black appearance. The used hydrous silicate of alumina is now placed in the ordinary fuller's earth burners in which the volatile carbonaceous matter is removed. From the fuller's earth burner it is discharged into a vertical tile tower through which is passed a current of dry chlorine gas at such a rate and in such quantity that the chlorine gas does not appreciably escape from the top. The residue at the bottom is drawn off and again used. When the residue after treatment with chlorine is used, it has been found that the gasoline distilled has a lower end point and a lower content of olefin compounds and the odor of the gasoline is considerably improved.

In the dehydration of petroleum, the petroleum only has to pass through the granular hydrous silicate of alumina to remove the water. In this case, the hydrous silicate of alumina is regenerated merely by heating to drive off the moisture until it becomes so impregnated with carbonaceous matter that it is subjected to the treatment herein described for revivifying the exhausted material.

In the treatment of kerosene or other refined petroleum, which has previously been treated with acid, the hydrous silicate of alumina removes the last trace of acid as well as decolorizes and dehydrates the oil.

The treatment of lubricants with hydrous silicate of alumina is accomplished in the same manner as with ordinary fuller's earth using preferably 20 to 30 mesh material. The residual hydrous silicate of alumina is regenerated in the usual manner except that the added step of treatment with dry chlorine is used.

For the treatment of transformer oils, hydrous silicate of alumina is particularly valuable as it removes the last trace of moisture without adding anything to the oil which will have a greater conductivity than the water even in case the last traces of hydrous silicate of alumina are not removed.

I claim as my invention:

1. A process for the revivification and treatment of bentonite for use in refining oil, comprising passing dry chlorine gas in contact therewith at temperatures sufficiently high to effect a combination of the chlorine and alumina constituents.

2. A process for the revivification and treatment of bentonite for use in oil refining, comprising the steps of initially heating the material, and passing dry chlorine gas thereover sufficiently heated to effect a combination of the chlorine and alumina constitutents.

3. A process for the revivification and treatment of bentonite, comprising initially calcining the material, and contacting dry chlorine gas therewith sufficiently heated to effect a combination of the chlorine and alumina constitutents.

4. A process for the revivification and treatment of spent hydrous alumina silicates, comprising the steps of heat treating the material, and subjecting the treated material to the action of dry chlorine gas, as and for the purpose described.

5. A process for revivifying and modifying the character of spent bentonite resulting from the treatment of oils with bentonite, which comprises driving off adsorbed volatile carbonaceous substances retained in the spent bentonite, and thereafter treating the bentonite with chlorine gas.

ROY CROSS.